United States Patent [19]

Brun, Jr. et al.

[11] Patent Number: 4,950,152

[45] Date of Patent: Aug. 21, 1990

[54] APPARATUS FOR PRODUCING PREFORMS AND BLOW MOLDED ARTICLES

[75] Inventors: Charles J. Brun, Jr., Xenia; Anthony F. Newport, Dayton, both of Ohio

[73] Assignee: Electra Form, Inc., Vandalia, Ohio

[21] Appl. No.: 279,662

[22] Filed: Dec. 5, 1988

[51] Int. Cl.$^5$ ............................................. B29C 49/06
[52] U.S. Cl. .................................... 425/533; 264/537; 425/534
[58] Field of Search ................. 425/533, 534; 264/537

[56] References Cited

U.S. PATENT DOCUMENTS

| Re. 32,129 | 4/1986 | Aoki | 425/525 |
|---|---|---|---|
| 3,492,690 | 2/1970 | Goldring et al. | 264/537 X |
| 3,941,539 | 3/1976 | Saumsiegle et al. | 425/533 X |
| 4,140,464 | 2/1979 | Spurr et al. | 425/534 X |
| 4,209,290 | 6/1980 | Rees et al. | 425/526 X |
| 4,310,282 | 1/1982 | Spurr et al. | 425/533 X |
| 4,376,090 | 3/1983 | Marcus | 264/530 |
| 4,405,556 | 9/1983 | Valyi | 425/533 X |
| 4,457,689 | 7/1984 | Aoki | 425/525 |
| 4,472,131 | 9/1984 | Ryder | 425/548 |
| 4,497,624 | 2/1985 | Brun et al. | 425/548 |
| 4,571,171 | 2/1986 | Blank et al. | 425/533 |
| 4,721,452 | 1/1988 | Delfer | 425/534 X |

FOREIGN PATENT DOCUMENTS

| 1183327 | 3/1970 | United Kingdom | 425/533 |
|---|---|---|---|
| 1308781 | 3/1973 | United Kingdom | 264/537 |

Primary Examiner—Richard L. Chiesa
Attorney, Agent, or Firm—Jacox & Meckstroth

[57] ABSTRACT

A plurality of injection cores are inserted by a movable platen into corresponding injection cavities defined by mold inserts within a stationary platen, and the cores extend through corresponding split transfer mold cavities. After hollow preforms with threaded neck portions are molded within the cavities, the preforms are removed from the mold cavities, separated from the injection cores, and then shifted transversely by the split transfer molds to cooling or blow cavities defined by blow cavity inserts within the stationary platen on opposite sides of the corresponding injection cavities. The transfer molds return to receive the injection cores, and corresponding blow core units are inserted into the preforms within the blow cavities for pressurizing and expanding the preforms into firm contact with the blow inserts. The preforms are removed from the blow cavities by the blow cores on alternate cycles of press operation and are then released by retraction of the blow cores. The split transfer molds are shifted transversely in opposite directions and are opened and closed by a cam system which includes cam tracks mounted on the movable platen and incorporating cam track switches.

21 Claims, 4 Drawing Sheets

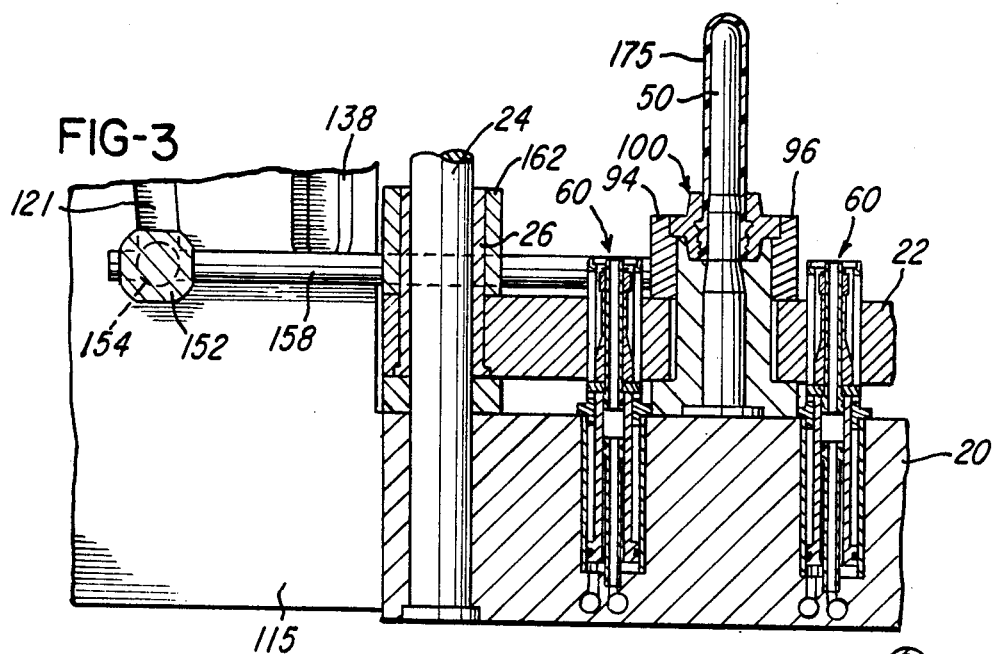
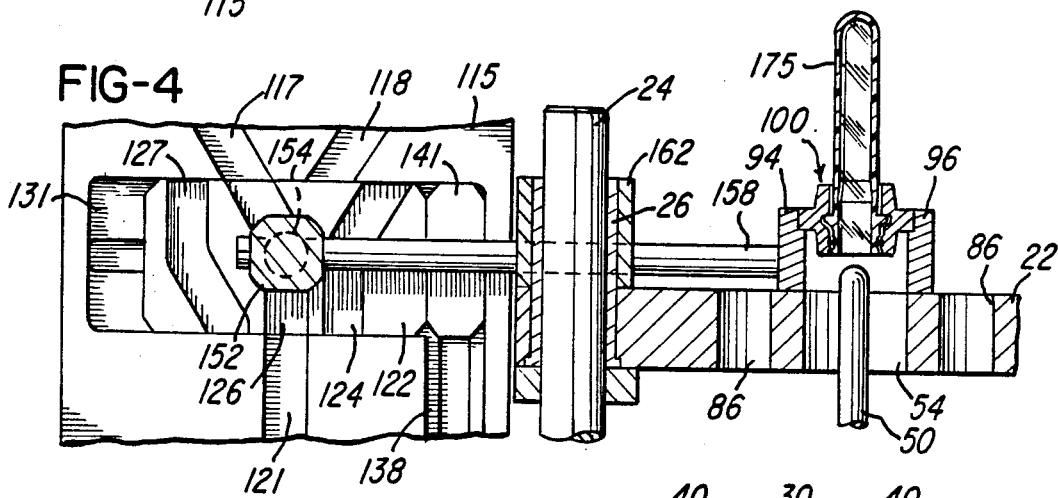
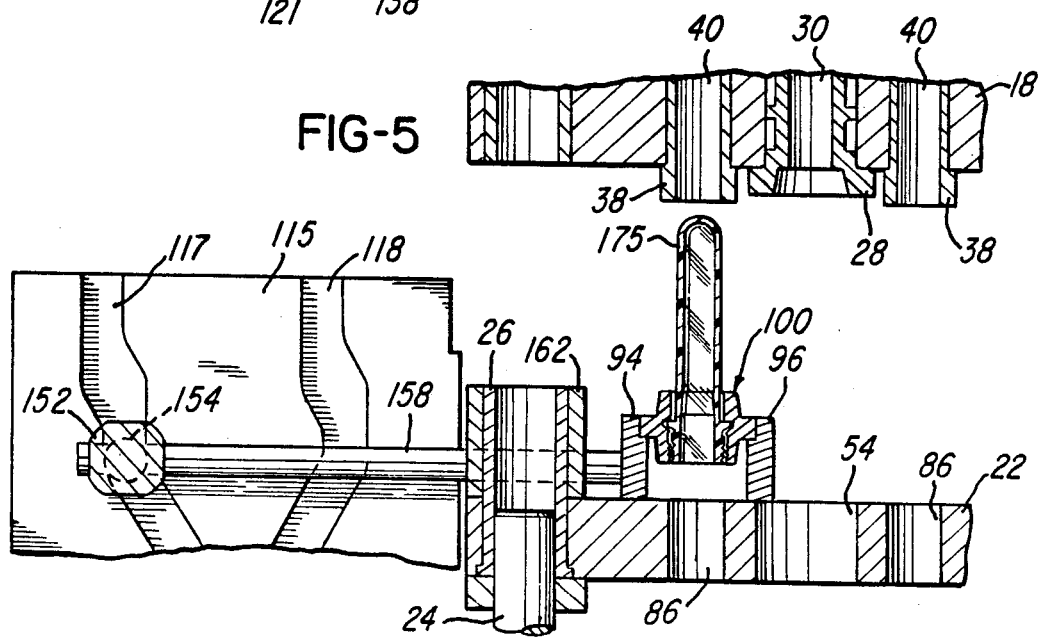

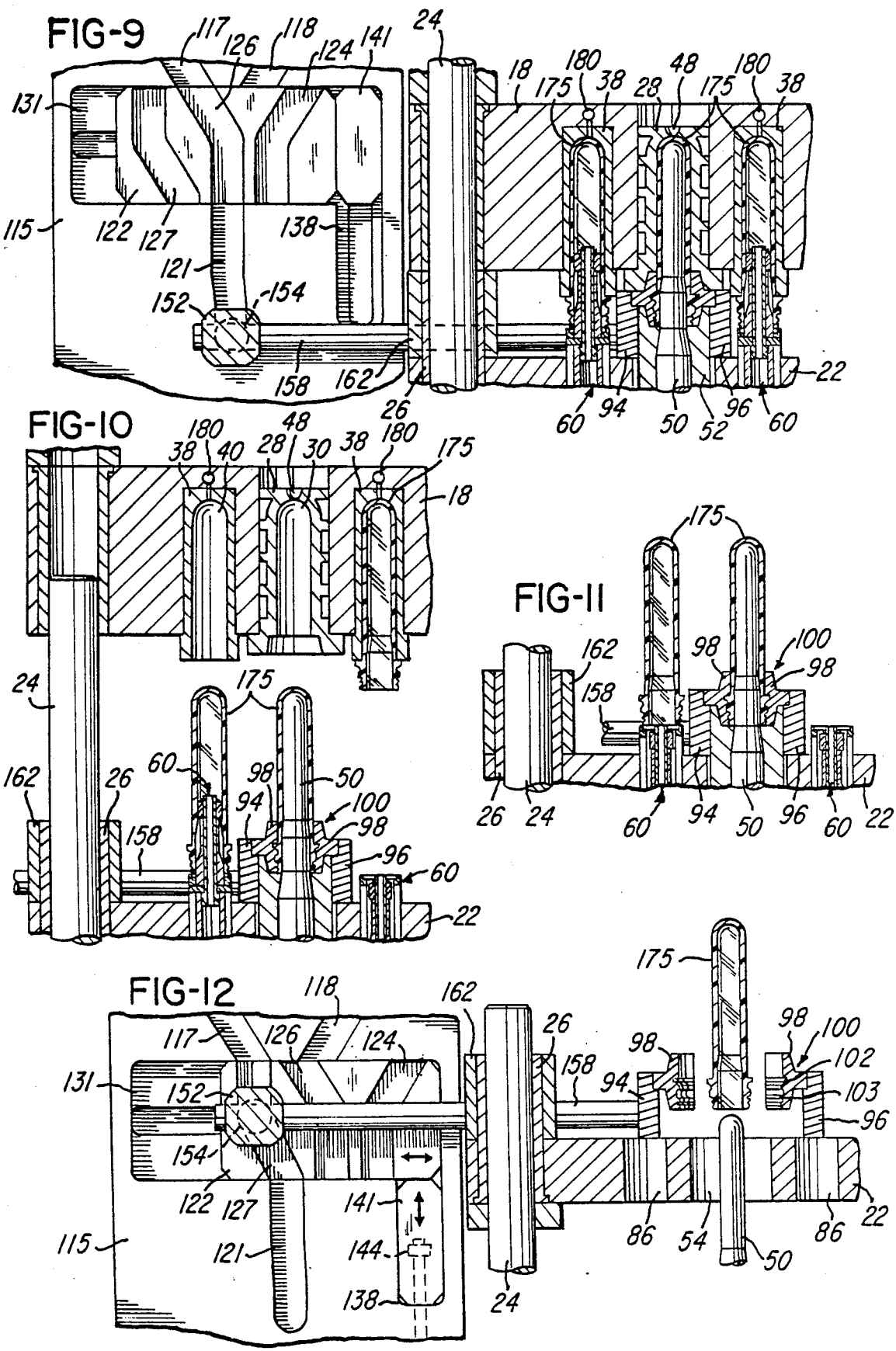

APPARATUS FOR PRODUCING PREFORMS AND BLOW MOLDED ARTICLES

BACKGROUND OF THE INVENTION

In the production of blow molded articles or containers with threaded neck portions, for example, of the type disclosed in U.S. Pat. No. 4,497,624 which issued to the assignee of the present invention, it is sometimes desirable to mold the parisons or preforms in one injection molding press and at a later time reheat the preforms for blow molding into the substantially larger containers.

It is also well known that the cycle for injection molding preforms is substantially longer than the cycle for blow molding the preforms into larger containers. Thus when producing blow molded containers in high volume, such as the one liter or two liter containers used for carbonated beverages, it has not been practical to blow mold the preforms into containers before the preforms cool and during the injection molding cycle for the preforms.

One type of machine which injection molds preforms and immediately thereafter blow molds the preforms into larger containers is disclosed in Katasi Aoki, U.S. Pat. No. 4,457,689 and Reissue Patent No. 32,129. In these blow molding machines, the preforms are transferred from the injection molding station to the blow molding station by means of a rotary indexing disk so that the cycle time for the blow molding operation is the same as the cycle time for the injection molding operation.

Another type of blow molding machine where preforms are blow molded immediately after the preforms are injection molded, is disclosed in U.S. patents issued to Emery I. Valyi, Leonard B. Ryder and Paul Marcus. These patents include U.S. Pat. Nos. 4,405,556, No. 4,472,131 and U.S. Pat. No. 4,376,090. In the blow molding machines disclosed in these patents, the preforms are transferred along a linear path from the preform injection molds to the blow molds, for example, by laterally shifting the core elements for forming the preforms and for blow molding the preforms into larger containers. It is also known to transfer the injection molded preforms from the injection mold immediately after the preforms are molded by means of some form of robotic or other transfer system which also cools the preforms as they are being removed from the injection mold. Such systems are disclosed, for example, in U.S. Pat. Nos. 4,140,464, 4,209,290 and U.S. Pat. No. 4,721,452.

When the preforms are produced within an injection mold mounted on a conventional injection molding press which is not equipped with a transfer system, the cycle time for molding the preforms and for allowing the preforms to cool sufficiently within the press, it is usually between twenty to thirty seconds per cycle. This cycle time results from the relatively heavy wall thickness of the preform and the time required to cool the plastics material within the mold from approximately 550 degrees F. down to 150 degrees F. where the preforms may be ejected or stripped from the mold without being deformed or damaged. In order to obtain high volume production of preforms for subsequent blow molding into large containers, it is desirable for the injection mold to have a substantial number of cavities and to minimize the time for molding and cooling the preforms within the injection mold.

SUMMARY OF THE INVENTION

The present invention is directed to an improved injection mold assembly and method of injection molding preforms or other hollow articles within a conventional injection molding press and for minimizing the cycle time without the use of robotic or transfer equipment for simultaneously cooling and transferring the molded preforms from the injection mold. The mold assembly or apparatus of the invention is also dependable in operation and is adapted to be continuously used over an extended period of time with a minimum of down time for servicing.

In accordance with one embodiment of the invention, an injection mold assembly includes a stationary platen and a parallel spaced movable platen with a stripper platen supported for relative movement between the stationary and movable platens. A substantial number of injection cavities are formed within the stationary platen by corresponding mold inserts, and a pair of blow cavity mold inserts are installed within the stationary platen on opposite sides of each injection mold insert. The movable platen carries an injection core in alignment with each injection cavity and also carries corresponding extendable blow core units which are axially aligned with the cooling or blow cavities.

A pair of split transfer molds having thread defining sections form an extension of each injection cavity, and the transfer molds are supported for lateral movement by slide bars mounted on the stripper platen. The transfer molds are moved laterally relatively to the stripper platen between alignment with the injection cavities and with the blow cavities by means of a cam track system which also opens and closes the transfer molds for releasing the preforms after they are transferred to the blow cavities. The blow core units provide for expanding and pressurizing the preforms within the blow cavities to effect efficient cooling of the preforms within the blow cavities Preferably, the molded preforms are alternately transferred to the cooling or blow mold cavities on opposite sides of the injection cavities by means of cam track switches, and each preform is cooled within a blow cavity during two cycles of operation.

Other features and advantages of the invention will be apparent from the following description, the accompanying drawings and the appended claims.

BRIEF DESCRIPTION OF THE DRAWINGS

FIGS. 3–11 are fragmentary sections similar to FIG. 2 and illustrating the operation of the mold assembly; and FIG. 12 is another fragmentary section similar to FIGS. 2–11 and illustrating the operation of the mold assembly during startup.

DESCRIPTION OF THE PREFERRED EMBODIMENT

Figure 1:
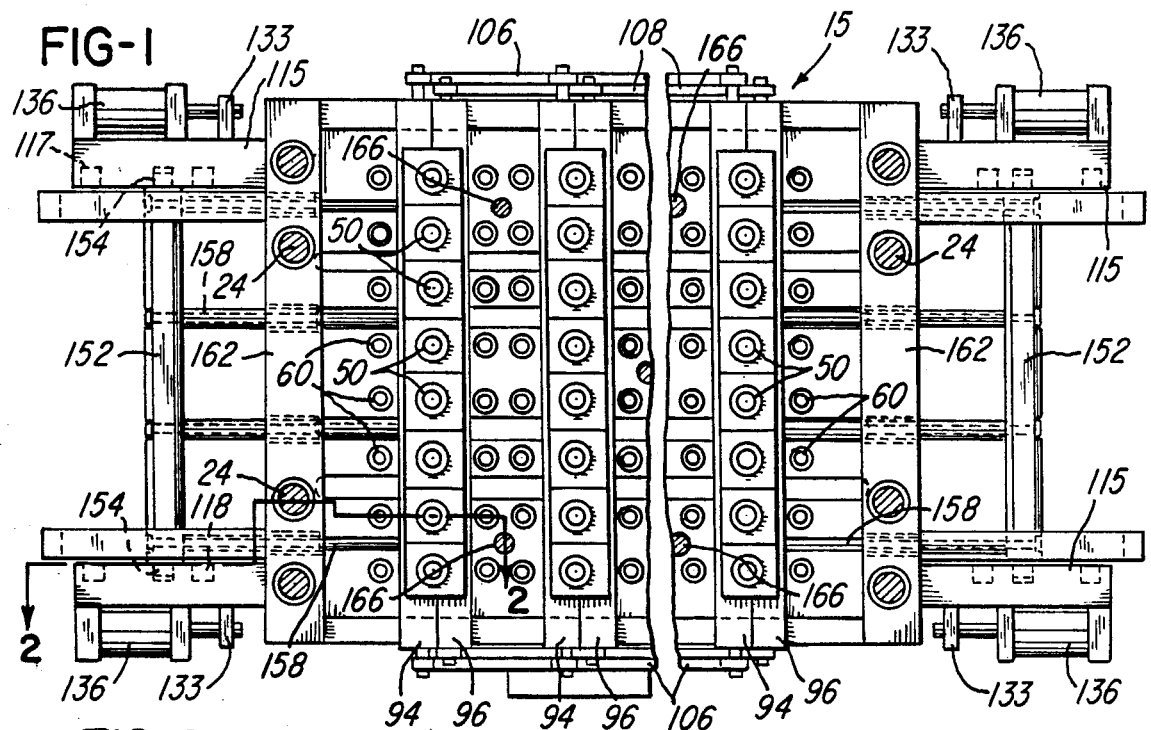
FIG. 1 is an elevational view of an open injection mold assembly constructed in accordance with the invention and generally viewing the movable components of the mold assembly with a center portion broken away.
Figure 2:
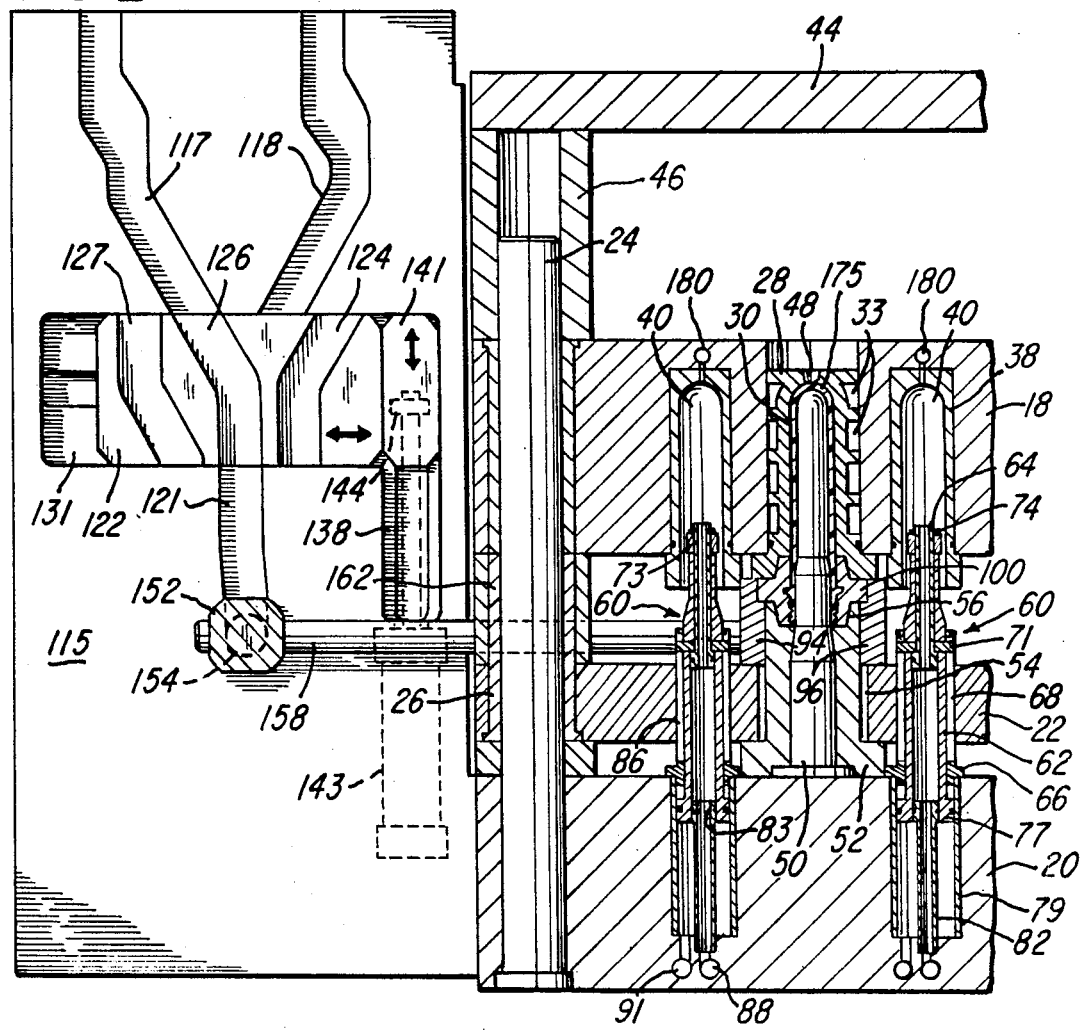
FIG. 2 is a fragmentary section of the mold assembly taken generally on the line 2—2 of FIG. 1 with the mold assembly in the closed position.

Referring to FIGS. 1 and 2, a mold assembly 15 includes a stationary platen 18 and a movable platen 20 which are connected in a conventional manner by corner guide rods or columns (not shown) which receive anti-friction linear bearings retained within the movable platen 20. A stripper platen 22 is located between the mold platens 18 and 20 and is supported for movement between the platens 18 and 20 by a set of parallel guide rods 24. The rods 24 are secured to the movable platen 20 and extend through corresponding bushings 26 retained within the stripper platen 22.

A plurality of injection mold inserts 28 (FIG. 2) extend into corresponding bores within the stationary platen 18 and define corresponding preform cavities 30 in a manner similar to that disclosed in above mentioned U.S. Pat. No. 4,497,624, the disclosure of which is incorporated by reference. Each of the mold inserts 28 has axially spaced peripheral grooves 33 for receiving a liquid coolant or water which is circulated within the stationary mold 18 through passages (not shown) connected to the grooves 33. The mold assembly 15 illustrated in FIG. 1 is provided with forty eight mold inserts 28 and corresponding cavities 30, but additional or fewer mold inserts may be used according to the desired production rate and the size of the injection molding press.

For each of the injection mold inserts 28 within the stationary platen 18, a pair of blow mold inserts 38 (FIG. 2) extend into the stationary platen on opposite sides of the injection mold insert 28. Each of the mold inserts 38 defines a cooling or blow cavity 40 which has substantially the same shape as the injection mold cavity 30 but is slightly greater in diameter, for example, on the order of 0.010 inch. Molten plastics material is injected into the cavities 30 from an injection molding press through a manifold system (not shown) of the general type disclosed in above-mentioned U.S. Pat. No. 4,497,624 and which is retained adjacent the stationary platen 18 by an end plate 44. The plate 44 is secured to the stationary platen 18 by suitable bolts (not shown) and is spaced from the platen by a set of spacing rails 46 which receive the guide rods 24. The molten plastics material enters each cavity 30 through a corresponding port 48 connected to the manifold in a manner as shown in abovementioned U.S. Pat. No. 4,497,624.

A plurality of elongated injection cores 50 are secured to the movable platen 20 by corresponding sleeves 52, and the cores 50 are axially aligned with the cavities 30 within the corresponding mold inserts 28. The sleeves 52 project through corresponding clearance holes 54 within the stripper platen 22, and a frusto-conical recess 56 is formed in the outer end portion of each collar 52.

The movable platen 20 also supports a corresponding plurality of blow core units 60, one of which is axially aligned with each blow cavity 40. As shown in FIG. 2, each of the units 60 includes an elongated tubular core member 62 which receives a pressure tube 64 and is slidably supported within a sleeve 66 secured to the movable platen 20. The sleeve 66 has diametrically opposed and axially extending slots 68 which receive corresponding stops 71 projecting outwardly from the core member 62. A resilient seal 73 is mounted on a projecting end portion of each tube 64 and is retained by a retainer 74. A piston 77 forms the opposite end portion of the core member 62 and is slidably received within a linear sleeve 79 confined within the movable platen 20.

A smaller stationary tube 82 is also secured to the movable platen 20 and has a sealed end portion 83 slidably received within the rearward end portion of the core member 62. The stripper platen 22 has a clearance bore 86 for each of the core units 60, and the inner passages within the core units are connected for selectively receiving pressurized air through manifold passages 88 connected to a suitable pressurized air supply through a control valve (not shown). The sleeves 79 are also connected by manifold passages 91 to a source of pressurized air supplied through suitable control valves.

As also shown in FIGS. 1 and 2, the stripper platen 22 supports a pair of crossbars 94 and 96 for each row of injection mold inserts 28, and each pair of bars 94 and 96 carry corresponding half sections 98 (FIG. 6) of a set of transfer molds 100. The sections 98 of each transfer mold 100 define a neck recess portion 102 (FIG. 8) and a thread recess portion 103 and cooperate to form an extension of the corresponding injection mold cavity 30.

Referring to FIG. 1, the corresponding bars 94 of the mold assembly 15 are interconnected by outboard tie rods 106, and the crossbars 96 are similarly connected by outboard tie rods 108 so that all of the crossbars 94 move together in unison on the stripper platen 22 and all of the crossbars 96 move together in unison on the stripper platen.

The movable platen 20 also supports and carries four cam members or plates 115 (FIGS. 1 and 2) each of which has a set of cam tracks 117 and 118 connected to a single cam track 121 through a cam track switch block 122 having a set of three connecting tracks 124, 126 and 127. Each switch block 122 is supported for sliding movement within a recess 131 formed within the cam plate 115. An angle bracket 133 (FIG. 1) connects each switch block 122 to the piston rod of a corresponding fluid or air cylinder 136. Another recess 138 is also formed within each cam plate 115 and extends at right angles to the recess 131 for receiving a sliding stop member 141 which limits the travel of the switch block 122 within the recess 131. Another fluid or air cylinder 143 (FIG. 2) is mounted on each cam plate 115 and has a piston rod connected by an angle bracket 144 to the stop member 141.

A follower bar 152 extends between each pair of cam plates 115, and opposite ends of each bar 152 supports a pair of rollers 154 which move within the cam tracks formed within the cam plates 115. A set of tie rods 158 (FIGS. 1 and 2) connect each bar 152 to the adjacent transfer bar 94 or 96, and each rod 158 extends through a corresponding guide bushing confined within a cross bar or member 162 secured to the stripper platen 22. The cross bars 162 also have bores which receive the bushings 26 which project from the stripper platen 22 and receive the guide rods 24.

A series of knock out rods 166 (FIG. 1) extend through corresponding holes within the movable platen 20 and have corresponding end portions secured to the stripper platen 22. The opposite end portions of the rods 166 are connected to a plate (not shown) outboard of the movable platen 20 and supported for movement in response to actuation of a set of fluid cylinders when it is desired to move the stripper platen 22 between the stationary platen 18 and the movable platen 20.

The operation of the mold assembly 15 will now be described in connection with FIGS. 2-11 which illustrate some of the different positions of the movable platen 20, stripper platen 22, core units 60 and transfer mold sections 98. The closed position of the mold assembly 15 is shown in FIG. 2. During the initial injection operation, molten plastics material at a temperature of about 550 degrees F. is simultaneously injected into all of the injection cavities 30 and corresponding split transfer molds 100 and around the corresponding cores 50 to form a batch of parisons or preforms 175. Each preform 175 has an externally threaded open end portion 176 (FIG. 8) projecting from an outwardly projecting flange 177 formed by the transfer molds sections 98.

After the preforms are molded and partially cooled, for example, down to 220 degrees F. within the mold inserts 28, the mold assembly 15 is opened by retracting the movable platen 20 and stripper platen 22, as shown in FIG. 3. During this operation, the tubular cores 62 are retracted into the corresponding sleeves 79 within the movable platen 20 by pressurizing the sleeve 79 above the pistons 77 through passages (not shown).

After the mold assembly is opened, the stripper platen 22 is extended or separated from the movable platen 20 (FIG. 4) by extending the knock-out rods 166 so that the preforms 175 are stripped from the injection cores 50 by the closed transfer molds 100. With this movement of the stripper platen 22 away from the movable platen 20, the cam follower rollers 154 move along the cam slots 121 and into the switch cam tracks 126 within the switch blocks 122, as shown in FIG. 4.

Figure 6:
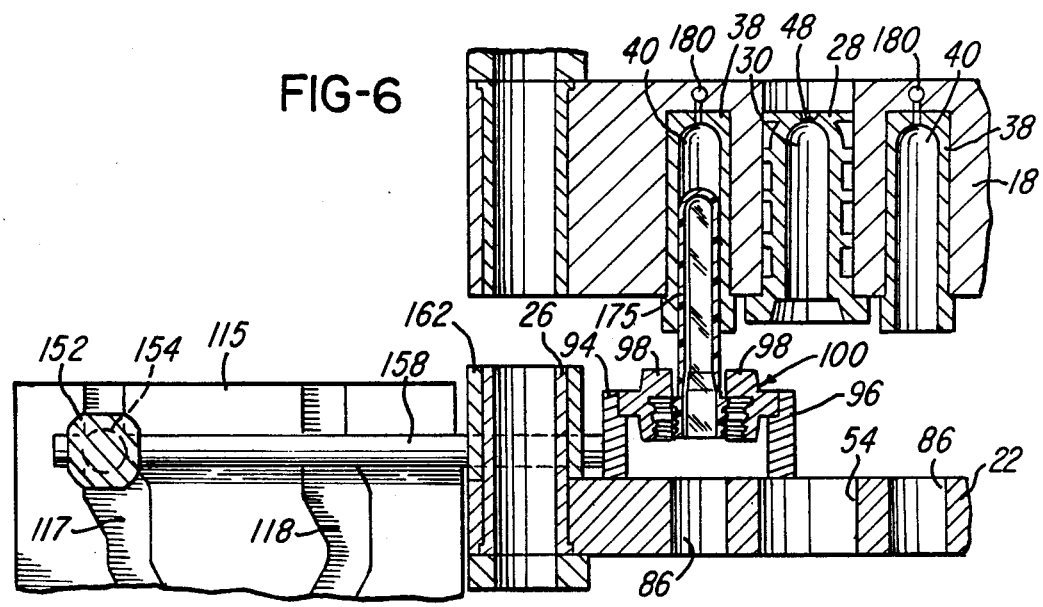

As the stripper platen 22 continues to move away from the movable platen 20, the split transfer molds 100 move the preforms 175 laterally or transversely to the left (FIG. 5) and into alignment with the corresponding blow cooling cavities 40 as a result of the cam rollers 154 moving along the cam tracks 117, as shown in FIG. 5. Continued movement of the stripper platen 22 and the rollers 154 within the cam tracks 117 is effective to move the preforms 175 into the aligned blow cavities 40 and then to open the split transfer molds sections 98 to release the preforms, as shown in FIG. 6. The bottom centers of the blow mold inserts 38 are connected by manifold passages 180 (FIG. 6) to a suitable vacuum or suction source which may also be reversed to supply pressurized air into the passages 180 during removal of the articles, as will be explained later. The suction within the cavities 40 is effective to pull the partially inserted preforms 175 into the cavities 40.

Figure 7:
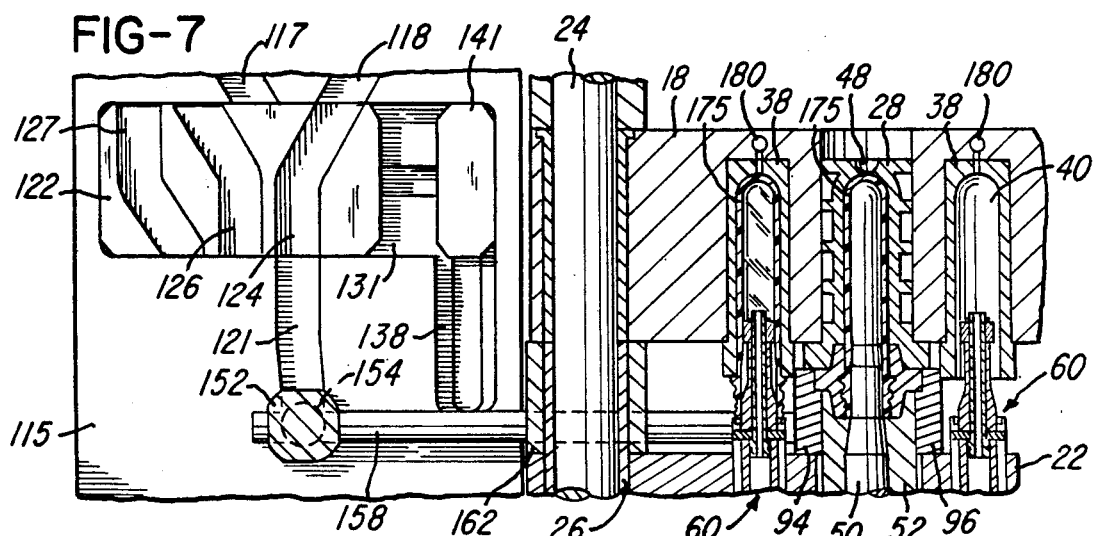

Referring to FIG. 7, as the cam rollers 154 return to the ends of the corresponding tracks 121 which is effective to close the transfer molds sections 98 and shift the transfer molds 100 back into alignment with the cavities 30 within the injection mold inserts 28. Then the mold closes by movement of the platen 20 which carries the cam blocks 115. During this second closing operation, the core members 62 of the blow core units 60 enter the preforms 175 within the blow cavities 40 by extending the core units 60 with pressurized air in the passages 91. The pressurized air behind the piston portion 77 of the core member 62 is also effective to compress the resilient seal 73 and expand the seal radially against the inner surface of the preform 175. Pressurized air is supplied to the passages 88 and through the tubes 64 and 82 to pressurize each preform 175 and expand it into firm contact with the walls of the blow mold inserts 38. This positive contact provides for rapid transfer of heat from the expanded or blown preforms into the stationary mold platen 18 which is maintained at a relatively constant temperature, for example, on the order of about forty degrees F.

Figure 8:
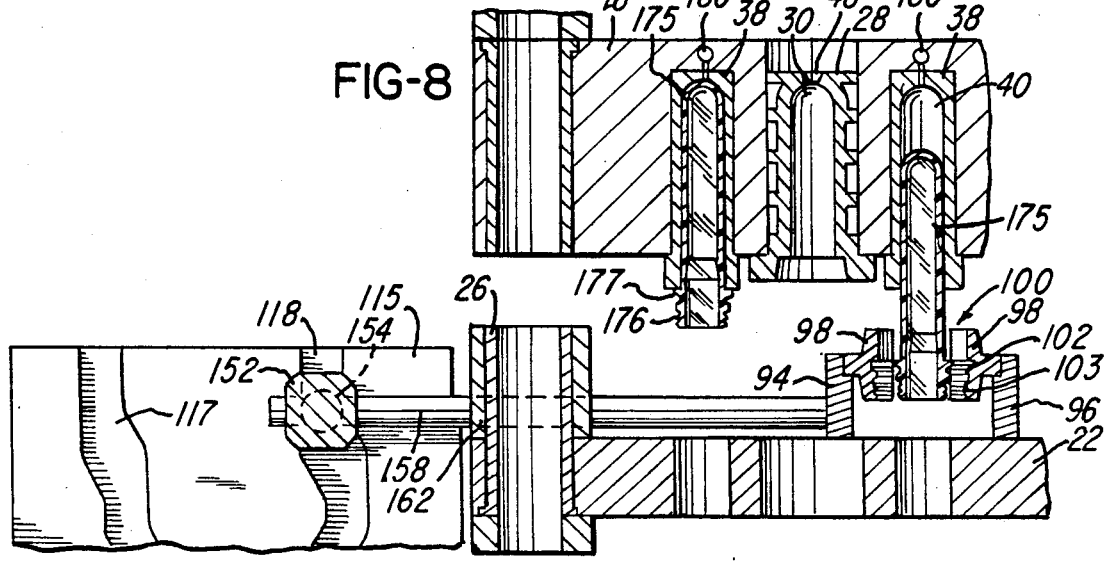

While the expanded preforms within the cavities 40 are cooling, another set of preforms are molded within the injection cavities 30, as illustrated in FIG. 7. During this second injection molding operation, the cam track switch blocks 122 are shifted laterally within the corresponding recesses 131 by actuation of the fluid cylinders 136, as shown in FIG. 7. In this position of the switch blocks 122, the cam tracks 121 are connected to the cam tracks 118 by the switch tracks 124. After the next set of preforms are molded within the cavities 30, they are removed from the cavities and separated from the cores 50 by repeating the operations described above in connection with FIGS. 3 and 4. The extension of the stripper platen 22 and the cam rollers 154 within the tracks 118 is effective to deposit the second set of preforms 175 into the blow cavities 40 on the opposite sides of the injection mold inserts 28, as shown in FIG. 8. The preforms within these blow cavities 40 are then pressurized and expanded by the corresponding core units 60 and while a third set of preforms are injection molded within the cavities 30, as shown in FIG. 9.

When the mold assembly 15 is open for the third time or after the third cycle, the expanded preforms within the blow cavities 40 on the left side (FIG. 9) of the mold inserts 28 are retracted from their corresponding blow cavities 40 by means of the corresponding core units 60, as shown in FIG. 10, and with the aid of pressurized air in the passages 180. When the movable platen 20 is being retracted, as shown in FIG. 11, the core units 60 are retracted, as discussed above in connection with FIG. 3, so that the cooled expanded preforms 175 are free to drop onto a suitable conveyor system such as an endless belt conveyor. Since the expanded or blown preforms remain in the corresponding cooling cavities 40 for two cycles of operation of the mold assembly, the preforms have sufficient time to cool by a substantial amount, for example, from 220 degrees F. to 125 degrees F. where the expanded preforms are sufficiently stable for removal from the mold assembly. The above described cycle of operation is then repeated so that the next set of molded preforms on the cores 50 are inserted into the preblow cavities 40 on the left of the injection cavities 30, as described above in reference to FIGS. 3-6.

Referring to FIG. 12, during the start up of the mold assembly 15, it is usually desirable to use a slower cycle time and allow the molded preforms to cool down to a release temperature within the injection mold cavities 30 and then release the preforms as soon as they are removed from the cavities 30. This is accomplished by retracting the stop members 141 within the cam plates 115 by actuation of the fluid cylinders 143 and then shifting all of the switch blocks 122 to their full right positions, as shown in FIG. 12. When the switch blocks 122 are in this third position and the stripper platen 22 and cam rollers 154 are moved forwardly, as mentioned above in connection with FIG. 4, the cam rollers 154 move into the tracks 127 and open the transfer mold sections 98 as soon as the preforms are stripped from the injection cores 50. The preforms are then free to drop onto the conveying system.

From the drawings and the above description, it is apparent that a mold assembly constructed in accordance with the present invention, provides desirable features and advantages. As a primary feature, the mold assembly provides for significantly reducing the cycle time for molding preforms, for example, from 20 to 30 seconds per cycle to 12 to 15 seconds per cycle. This substantial cycle time reduction significantly increases the production rate of the mold assembly and thus reduces the cost of producing the preforms. It is also apparent that the mold assembly of the invention is adapted for use in a conventional horizontal molding press and does not require any robotic equipment which simultaneously cools and removes the preforms from the mold assembly after the mold assembly is open such as disclosed in above mentioned U.S. Pat. Nos. 4,209,290 and 4,721,452.

While the form of apparatus amd method herein described constitute a preferred embodiment of the invention, it is to be understood that the invention is not limited to this precise form of apparatus and method, and that changes may be made therein without departing from the scope and spirit of the invention as defined in the appended claims.

The invention having thus been described, the following is claimed:

1. A mold assembly for efficiently producing hollow articles, comprising a stationary platen and a generally parallel movable platen, a stripper platen disposed between said stationary and movable platens, means defining a plurality of injection cavities and supported by said stationary platen, a corresponding plurality of injection cores supported by said movable platen for movement between retracted positions and extended positions within said injection cavities, means defining at least one blow cavity for each of said injection cavities and supported by said stationary platen adjacent said injection cavity, a blow core unit for each of said blow cavities and having an axis, means mounted on said movable platen and supporting each said blow core unit for axial movement between an extended position and a retracted position relative to said movable platen, a transfer mold unit for each of said injection cavities and forming an extension of said injection cavity, means mounted on said stripper platen and supporting said transfer mold units for lateral movement relative to said stripper platen and said injection cores and said blow core units and between corresponding alignment with said injection cavities and with said blow cavities, and means for moving said transfer mold units laterally relative to said injection cores and said blow core units for transferring the articles molded in said injection cavities to the corresponding said blow cavities without lateral transfer of said injection cores and said blow core units.

2. A mold assembly as defined in claim 1 wherein two of said blow cavities are defined within said stationary platen adjacent each of said injection cavities, and each said injection cavity is disposed between the corresponding two adjacent said blow cavities 3. A mold assembly as defined in claim 1 and including means defining a fluid passage to a closed end portion of each said blow cavity for directing pressurized air to move an preform within said blow cavity 4. A mold assembly as defined in claim 1 wherein each said transfer mold unit includes a pair of opposite mold sections having thread forming portions, and said means for moving said transfer mold units laterally is also effective to open and close said mold sections of each said mold unit.

5. A mold assembly as defined in claim 4 wherein said means for moving said transfer mold units comprise a cam actuated system movable in response to relative movement between said movable platen and said stripper platen.

6. A mold assembly as defined in claim 1 wherein said means for moving said transfer mold units relative to said cores comprise a set of cam members mounted on said movable platen for movement therewith, and cam follower members mounted for movement with said stripper platen and connecting said cam members to said transfer mold units.

7. A mold assembly as defined in claim 6 wherein each said cam member comprises a cam plate defining a series of tracks engagable by said cam follower members, and said tracks are arranged to move said transfer mold units between alignment with said injection cavities and alignment with said blow cavities.

8. A mold assembly as defined in claim 7 wherein each said cam plate includes a cam track switch for changing the direction of movement of said follower members, and means for moving each said cam track switch between at least two positions for moving said cam follower members along two different paths.

9. A mold assembly as defined in claim 1 wherein each said blow core unit comprises a tubular core member supported for movement between a retracted position and an extended position within a preform disposed within the corresponding said blow cavity, means for directing pressurized air through each said core member for expanding the article, and fluid actuated means for moving each said core member between its retracted and extended positions.

10. A mold assembly as defined in claim 1 wherein each said transfer mold unit comprises a pair of opposing mold sections, a pair of generally parallel bars supported by said stripper platen and connecting a row of said mold sections, and said moving means comprise cam actuated means connected to move said pair of bars laterally as a unit and also to move said pair of bars relative to each other.

11. A mold assembly as defined in claim 10 wherein said moving means comprise cam actuated plates mounted for movement with said movable platen and defining a set of cam tracks.

12. A mold assembly for efficiently producing hollow articles, comprising a stationary platen and a generally parallel movable platen, a stripper platen disposed between said stationary and movable platens, means defining a plurality of injection cavities and supported by said stationary platen, a corresponding plurality of injection cores supported by said movable platen for movement between retracted positions and extended positions within said injection cavities, means defining at least one blow cavity for each of said injection cavities and supported by said stationary platen adjacent said injection cavity, a blow core unit for each of said blow cavities and having an axis, means mounted on said movable platen and supporting each said blow core unit for axial movement between an extended position and a retracted position relative to said movable platen, a transfer mold unit for each of said injection cavities and forming an extension of said injection cavity, means mounted on said stripper platen and supporting said transfer mold units for simultaneous lateral movement relative to said stripper platen and said injection cores and said blow core units and between corresponding alignment with said injection cavities and with said blow cavities, and cam actuated means responsive to relative movement between said stripper platen and said movable platen for moving said transfer mold units laterally relative to said injection cores and said blow core units for transferring the articles molded in said injection cavities to the corresponding said blow cavities without lateral transfer of said injection cores and said blow core units.

13. A mold assembly as defined in claim 12 and including means defining a fluid passage extending to a closed end portion of each said blow cavity for directing pressurized air to move an article within said blow cavity.

14. A mold assembly as defined in claim 12 wherein said cam actuated means for moving said transfer mold units comprise a set of cam plates mounted on said movable platen for movement therewith, each said cam plate defining a set of tracks, and cam follower members mounted for movement with said stripper platen and engagable with said tracks.

15. A mold assembly as defined in claim 14 wherein said tracks are arranged to move said transfer mold units between alignment with said injection cavities and alignment with said blow cavities.

16. A mold assembly as defined in claim 15 wherein each said cam plate includes a cam track switch for changing the direction of movement of said follower members, and means for moving each said cam track switch between at least two positions for moving said cam follower members along two different paths.

17. A mold assembly as defined in claim 12 wherein each said core unit comprises a tubular core member supported for axial movement between a retracted position and an extended position within a preform disposed within the corresponding said blow cavity, means for directing pressurized air through each said core member for expanding the article, and fluid actuated means for moving said core member between its retracted and extended position.

18. A mold assembly for efficiently producing hollow articles, comprising a stationary platen and a generally parallel movable platen, a stripper platen disposed between said stationary and movable platens, means defining a plurality of injection cavities and supported by said stationary platen, a corresponding plurality of injection cores supported by said movable platen for movement between retracted positions and extended positions within said injection cavities, means defining two blow cavities for each of said injection cavities and supported by said stationary platen with said injection cavity therebetween, a blow core unit for each of said blow cavities and having an axis, means mounted on said movable platen and supporting each said blow core unit for axial movement between an extended position and a retracted position relative to said movable platen, a split transfer mold unit for each of said injection cavities and having a pair of opposing mold sections forming an extension of said injection cavity, means mounted on said stripper platen and supporting said transfer mold units for simultaneously lateral movement relative to said stripper platen and said injection cores and said blow core units and between alignment with the corresponding said injection mold cavities and alignment with the corresponding said blow cavities, and means for moving said transfer mold units laterally relative to said injection cores and said blow core units and for opening and closing said mold sections for transferring the articles molded in said injection cavities to the corresponding said blow cavities without lateral transfer of said injection cores and said blow core units.

19. A mold assembly as defined in claim 18 wherein said moving means is effective to move each said transfer mold unit from alignment with the corresponding said injection cavity alternately to alignment with each of the corresponding said blow cavities in response to relative movement between said movable platen and said stripper platen.

20. A mold assembly as defined in claim 18 wherein said means for moving said transfer mold units comprise a cam actuated system movable in response to relative movement between said movable platen and said stripper platen.

21. A mold assembly as defined in claim 18 and including a pair of generally parallel bars supported by said stripper platen and connecting a row of said mold sections, and said moving means are connected to move said pair of bars laterally as a unit and also to move said pair of bars relative to each other for opening and closing said mold sections.

* * * * *